United States Patent [19]

Dalimonte et al.

[11] Patent Number: 4,571,621
[45] Date of Patent: Feb. 18, 1986

[54] TELEVISION TRANSMITTER

[75] Inventors: Alfred A. Dalimonte, Westbury, N.Y.; Paul J. Fung, San Mateo, Calif.

[73] Assignee: Microband Corporation of America, New York, N.Y.

[21] Appl. No.: 504,705

[22] Filed: Jun. 15, 1983

[51] Int. Cl.⁴ .............................................. H04N 5/38
[52] U.S. Cl. ................................................... 358/186
[58] Field of Search ................. 358/186.19, 141, 142, 358/143; 455/108, 109, 51, 103

[56] References Cited

U.S. PATENT DOCUMENTS

| | | | |
|---|---|---|---|
| 2,536,255 | 1/1949 | Bedford et al. | 250/6 |
| 2,599,643 | 6/1952 | Kell | 250/6 |
| 2,644,942 | 7/1953 | Bedford | 343/208 |
| 3,548,085 | 12/1970 | Shimada | 358/186 |
| 3,659,040 | 4/1972 | Fujita | 358/19 |
| 3,800,224 | 3/1974 | Fletcher | 358/186 |
| 3,862,365 | 1/1975 | Kobayashi et al. | 325/58 |
| 3,927,373 | 12/1975 | Janssens | 325/58 |
| 4,061,974 | 12/1977 | Fletcher et al. | 325/58 |
| 4,117,405 | 9/1978 | Martinez | 325/58 |
| 4,255,814 | 3/1981 | Osborn | 455/51 |
| 4,259,744 | 3/1981 | Junod et al. | 455/103 |
| 4,317,220 | 2/1982 | Martin | 358/149 |

Primary Examiner—Tommy P. Chin
Attorney, Agent, or Firm—Beveridge, DeGrandi & Weilacher

[57] ABSTRACT

A television transmitter particularly suited for use in a multipoint distribution service television transmitting system for low power transmission within a limited geographical area. In such a system several transmitters can utilize a common set of reference signals to determine the carrier frequency of each transmitter. The transmitter includes a television modulator for modulating an applied video signal; a local oscillator circuit for generating a local oscillation signal, and a converter for converting the local oscillation signal and the modulated video signal to provide a television transmission signal. The local oscillator circuit receives a video signal to control the frequency of the local oscillation signals, for example in accordance with a characteristic of the color burst signal within the received video signal. The applied video signal can be the same as the received video signal or can be another television transmission signal. The television modulator can control the frequency of the modulated video signal in accordance with a VHF reference signal which can be another television transmission signal or can be a generated VHF reference signal the frequency of which is controlled by a parameter of the received video signal.

11 Claims, 7 Drawing Figures

TELEVISION TRANSMITTER

BACKGROUND OF THE INVENTION

The present invention pertains to a television transmitter. More particularly, the present invention pertains to a television transmitting system in which the frequency of the transmitter is controlled by reference signals common to several transmitters within a geographic region, thereby eliminating interference between two stations which are transmitting on the same frequency and which are geographically closely spaced.

The present invention can be utilized with any television transmitters but is particularly suited for use with multipoint distribution service (MDS) television transmitting systems which utilize low power transmitters to transmit signals within a limited geographic area. MDS transmitters in various geographic locations are frequently assigned to transmit on the same frequency or channel. This likewise might be true of other commercial and non-commercial television stations, such as stations in the Instructional Television Fixed Service (ITFS), particularly in large, overlapping metropolitan areas, for example San Francisco, Calif. and its suburbs. No problem exists if the transmitters are geographically spaced at a great enough distance that they do not interfere with each other in any location. However, the signals from two such transmitters located in relatively closely spaced urban locations might overlap in an area between the two transmitters. By way of example, the signals from a transmitter located in San Francisco and another located in Palo Alto, Calif. might both be receivable in a location between those two cities. Theoretically, the problem of interference in such an overlap area could be minimized if the two transmitters are transmitting at precisely the same carrier frequency. As a practical matter, however, slight frequency differences may exist in the signals from the two transmitters, and in the overlap area such frequency differences result in picture quality degradation.

Slight differences in frequency result in the generation of a beat frequency signal of a frequency equal to the difference in the carrier frequencies. The strength of the beat frequency signal is related to the difference in signal strength between the two carriers as seen at the input terminals of the receiving television set. The beat frequency signal can be detected by the average viewer whenever the difference between the signal strength of the desired signal and the signal strength of the undesired signal is less than a minimum amount, generally about 45 dB.

Observer sensitivity to the beat frequency signal is a function not only of the signal strength but also of the beat frequency. If the beat frequency can be reduced to a frequency below the lowest video frequency of the video signal, it can be effectively eliminated by circuitry within the television receiver, such as automatic gain control circuitry. Such circuitry can substantially reduce signal strength of a beat frequency of less than about 10 Hz. The video carrier frequency of an MDS Channel 1 station is 2154.75 MHz with a tolerance of 0.001%. In order to operate two stations on Channel 1 with a frequency difference of less than 10 Hz, the frequency determining elements of the transmitters would have to have tolerances of better than 2 parts in $1^9$. Operating such a system without a common reference would require the use of very precise frequency generators, such as very costly atomic frequency generators, and would be highly impractical.

SUMMARY OF THE INVENTION

The present invention is a television transmitter operable in a system of such transmitters and utilizing a common set of reference signals to determine the carrier frequency of each transmitter. As a consequence, the signal freqency of each transmitter in the system is maintained within limits effectively eliminating problems in overlap areas of reception.

Existing television transmitters, particularly MDS and ITFS transmitters, utilize a local oscillator to generate an intermediate frequency local oscillator signal which is then mixed with the audio and video signals from a VHF modulator to provide the television transmission signal. In accordance with the present invention, the local oscillation signal is generated by an oscillator phase locked with a signal derived from a submultiple of the color burst frequency of the input video signal. The frequency of this local oscillator signal is thus determined by the color burst signal. The VHF modulator signal is phase locked to a received television signal that is common to each television transmitter in the geographic area of concern. Thus, for example, the VHF modulators in two transmitters, each transmitting a common signal on Channel 1, might have their outputs phase locked to a Channel 7 signal which is received at the location of each transmitter, with the result that the frequencies of the two transmitters are tied to a common reference signal and so are substantially the same.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

DETAILED DESCRIPTION OF THE INVENTION

The invention will be described in detail with reference to an MDS transmitter operating on Channel 1, but the invention is equally applicable to other channels and to other television transmitters.

Figure 1:
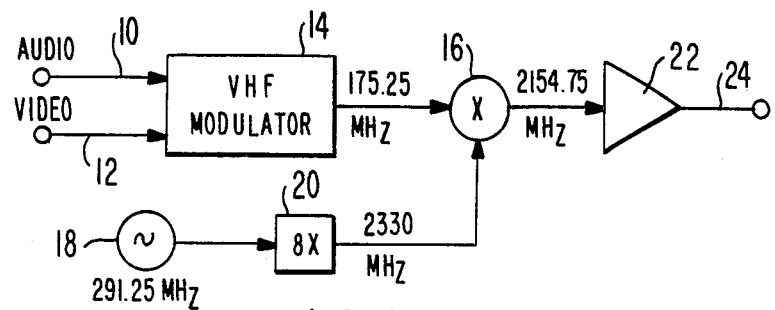
FIG. 1 is a block diagram of a prior art MDS transmitter.

In the prior art MDS transmitter of FIG. 1, the audio and video base band signals are applied by lines 10 and 12 respectively to VHF modulator 14. The resulting signal from modulator 14 is applied to one input of up converter 16. Local oscillator 18 and frequency multiplier 20 apply an intermediate frequency local oscillation signal to the second input of up converter 16. As a consequence, up converter 16 applies a television transmission signal through output amplifier 22 to output line 24.

FIG. 1 illustratively depicts frequencies suitable for MDS Channel 1. Thus the output from VHF modulator 14 is indicated as being 175.25 MHz, while the intermediate frequency signal from multiplier 20 is indicated as being 2,330 MHz. As a consequence, the television transmission signal from up converter 16 is a signal at a frequency of 2,154.75 MHz. The 2,330 MHz signal from frequency multiplier 20 is derived from a 291.25 MHz signal from local oscillator 18 which is frequency multiplied by 8 within multiplier 20.

Figure 2:
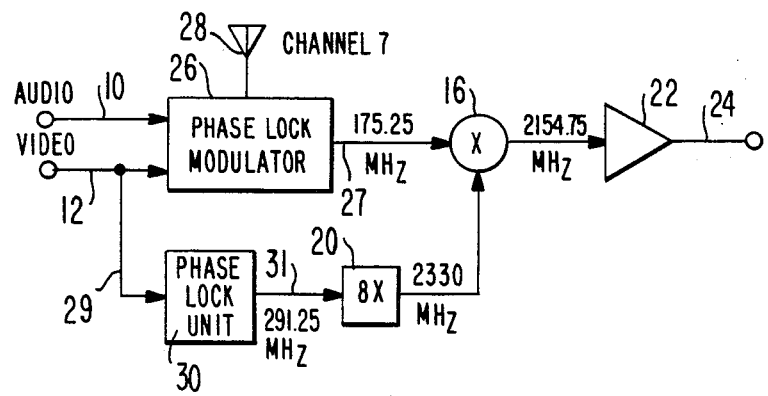
FIG. 2 is a block diagram of an MDS transmitter in accordance with the present invention.

FIG. 2 depicts an MDS transmitter in accordance with the present invention. The audio and video base band signals on input lines 10 and 12 are applied to a phase lock modulator 26 which also receives a VHF reference signal such as a Channel 7 television signal from a source 28 which might be a conventional VHF television antenna receiving the Channel 7 signal from an over-the-air television transmitter such as a commercial station. Modulator 26 provides a 175.25 MHz signal on its output line 27 to up converter 16. This signal from modulator 26 is phase locked to the received Channel 7 signal from input 28, and so the frequency of the 175.25 MHz signal is determined by that Channel 7 signal.

In the embodiment of FIG. 2, the video signal from input 12 is also applied by line 29 to phase lock unit 30, which applies a 291.25 MHz signal on its output line 31 to frequency multiplier 20. Frequency multiplier 20 multiplies the frequency of this signal by 8 to provide a 2,330 MHz to the second input of up converter 16. As a consequence, up converter 16 applies to output amplifier 22 and output line 24 a 2,154.75 MHz television transmission signal the exact frequency of which is determined by frequency of the received Channel 7 signal at input 28 and the frequency of the color burst signal in the video signal on line 29.

Figure 3:
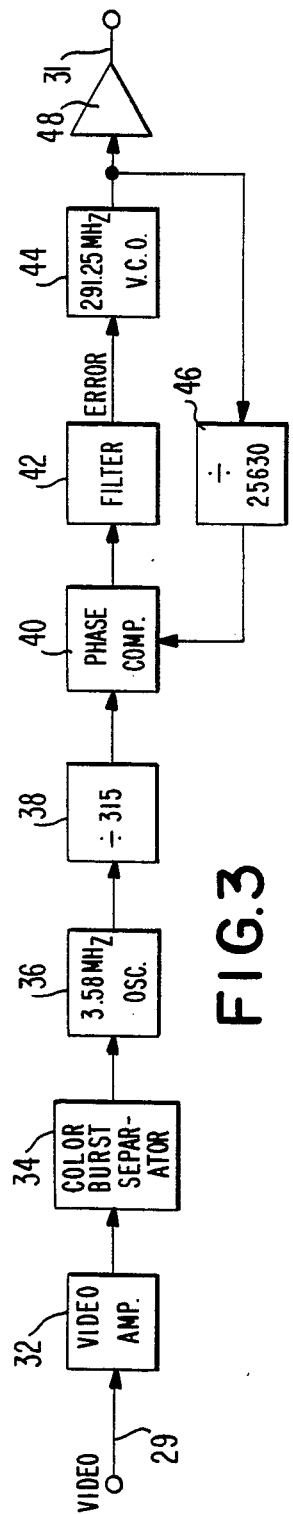
FIG. 3 is a block diagram of a phase lock unit suitable for incorporation into the transmitter of FIG. 2.

FIG. 3 is a block diagram depicting phase lock unit 30. The received video signal on input line 29 is applied through video amplifier 32 to color burst separator 34. The output from color burst separator 34 is applied to 3.58 MHz oscillator 36 to phase lock that oscillator with the color burst signal. Consequently, the precise output frequency of oscillator 36 is dependent upon the color burst signal within the video signal on line 12. The United States Federal Communications Commission defines this color burst signal frequency as $(5 \times 63 - 88)$ MH$_z$ or 3.579545$\overline{4}$ MH$_z$.

The output from oscillator 36 is applied to frequency divider 38 the output of which is applied to one input of phase comparer 40. The output of phase comparer 40 is applied through filter 42 to the control input of voltage controlled oscillator 44. The output of oscillator 44 is applied to frequency divider 46 which divides the frequency of that signal by a factor giving a signal of the same frequency as that from frequency divider 38. This signal from frequency divider 46 is applied to the second input of phase comparer 40. As a consequence the output of phase comparer 40 is a signal indicative of the difference or error between a signal phase locked to the color burst signal in the received video signal and a signal derived from the output of voltage controlled oscillator 44. The output of phase comparer 40 controls voltage controlled oscillator 44 so that that oscillator's output is held at a precise frequency dependent on the received color burst signal. That output from oscillator 44 passes through amplifier 48 to output line 31 and thus to multiplier 20.

The factors by which the output of oscillator 36 and the output of oscillator 44 are divided by dividers 38 and 46, respectively, are dependent upon the frequency of the modulator and the frequency to be transmitted. For example, for Channel 1 transmission at 2,154.75 MHz, the 3.579545$\overline{4}$ MHz output from oscillator 36 can be divided by 315 in divider 38, to give a frequency of 11,363.63$\overline{63}$ Hz, while oscillator 44 can be a voltage controlled oscillator centered about a frequency of 291.25 MHz and divider 46 can divide the frequency of this signal by 25,630 to give the same frequency of 11,363.63$\overline{63}$ Hz. In practice, the 291.25 MHz signal might be frequency divided by 11, then by 10, then by 233 to give division by 25,630.

Figure 4:
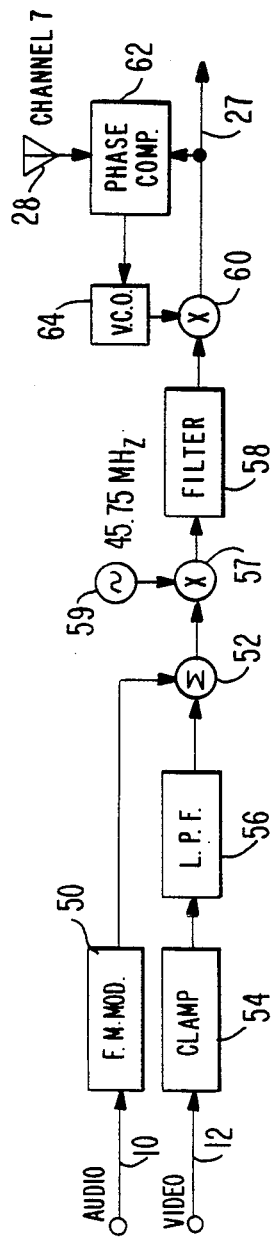
FIG. 4 is a block diagram of a phase lock modulator suitable for incorporation into the transmitter of FIG. 2.

Phase lock modulator 26 can be an RCA Corporation phase lock modulator, by way of example. FIG. 4 depicts a block diagram of a suitable phase lock modulator. The audio input signal on line 10 passes through FM modulator 50 to one input of summing network 52. The video input signal on line 12 passes through clamp 54 and low pass filter 56 to the second input of summing network 52. The output of summing network 52 is applied to one input of up converter 57 which receives at its second input a 45.75 MHz signal from a local oscillator 59. The resulting signal is applied through filter 58 and mixer 60 to output line 27 and thus to up converter 16. The output from mixer 60 is also applied to one input of phase comparer 62 which compares that signal with a signal derived from the Channel 7 television signal received from an over-the-air television transmitter. The resulting error signal is applied to voltage controlled oscillator 64, the output of which is applied to the second input of mixer 60 to control the frequency of the output signal on line 27.

In the system of FIG. 2, up converter 16 thus receives on line 27 a signal whose frequency is tied to the received Channel 7 signal and on line 31 a signal whose frequency is tied to the color burst signal in the applied video signal on line 12. The frequency of the television transmission signal on output line 24 is thus determined by these two references which are available to all MDS transmitters within a particular limited geographic region. Accordingly, in accordance with this embodiment of the present invention each television transmitter which is located so that there are geographic areas in which its signal overlaps with the signal from another transmitter is receiving the same Channel 7 signal from a nearby over-the-air transmitter and is broadcasting the same video signal from line 12, with the result that the frequencies of the television transmission signals on output lines 24 from those transmitters are substantially the same. Therefore, television receivers in the area of signal overlap receive the transmitted signals with frequencies that are identical or are so close that the internal circuitry of the receivers is able to eliminate the effects of the frequency difference so that viewers do not notice interference between the signals.

Figure 5:
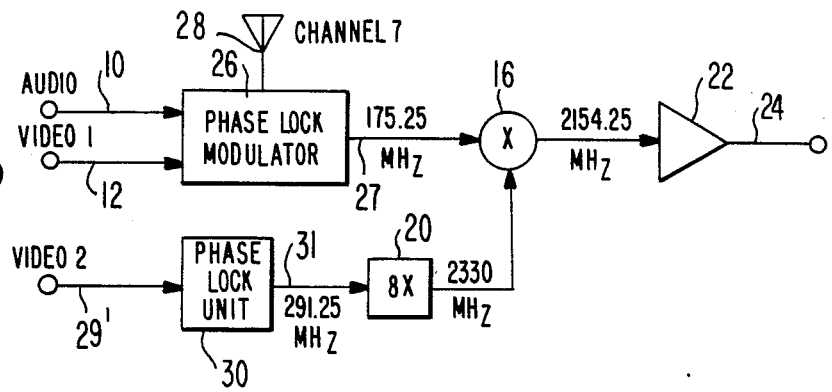
FIG. 5 is a block diagram of a modified embodiment of an MDS transmitter in accordance with the present invention.

If the two television transmitters are broadcasting different programs, and so are receiving different video signals on their inputs 12, a common video signal must be applied to the line 29 of the two phase lock units 30 to provide a common color burst signal for control of the frequency of oscillator 44. By way of example, if one television transmitter is providing programming from one television network while a second station, having a reception area partially overlapping that of the first, is providing programming from another network, rather than each transmitter using its own video input as the input on its line 29 to its video amplifier 32 within its phase lock unit 30, both video amplifiers 32 are connected to receive on their respective lines 29 a common video input signal, which might be the signal of either network or, as depicted on input line 29' of FIG. 5, might be the signal from another, different television transmitter, for example another channel receivable at both phase-locked transmitter locations.

Figure 6:
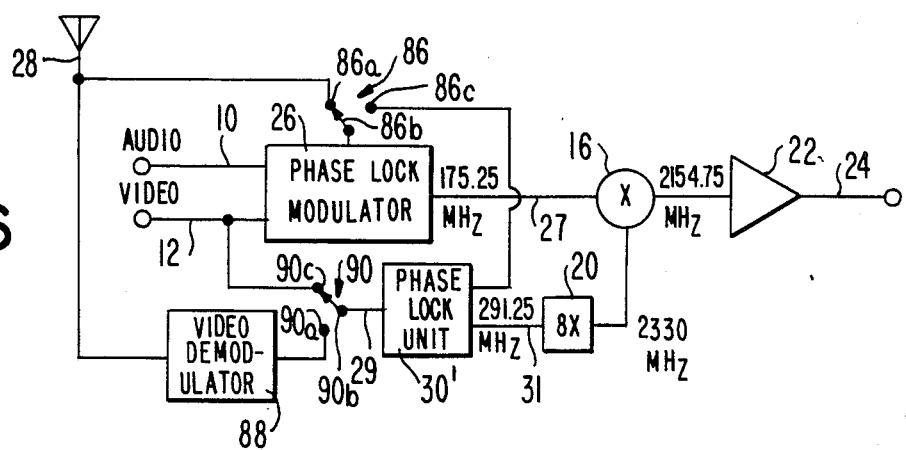
FIG. 6 is a block diagram of another modified embodiment of an MDS transmitter in accordance with the present invention.

FIG. 6 is a block diagram of a generalized form of the present invention usable when two television transmitters are broadcasting the same program or different programs. Antenna 28 is connected to fixed contact 86a of single-pole-double-throw switch 86 and to the input of video demodulator 8. The output of demodulator 88 is connected to fixed contact 90a a of single-pole-double-throw switch 90. Movable contact 86b of switch 86 is connected to provide the VHF reference signal to phase lock modulator 26 which receives the audio and video base band signals on its input lines 10 and 12.

Movable contact 90b of switch 90 is connected to input line 29 of phase lock unit 30', the output of which is applied by line 31 through frequency multiplier 20 to an input of up converter 16, just as in the embodiment of FIG. 2. Video signal input line 12 is also connected to fixed contact 90c of switch 90. Accordingly, depending upon the position of switch 90, input line 29 applies to video amplifier 32 within phase lock unit 30' either the video input signal of line 12 or the video signal of the received television signal from antenna 28. All that is required is that both television transmitters have their respective switches 90 switched to provide the same signal to their respective phase lock units 30'.

Phase lock unit 30' applies a VHF reference signal to fixed contact 86c of switch 86. Accordingly, phase comparer 62 within phase lock modulator 26 receives either the television signal from antenna 28 or this VHF reference signal from phase lock unit 30, depending upon the position of switch 86.

Figure 7:
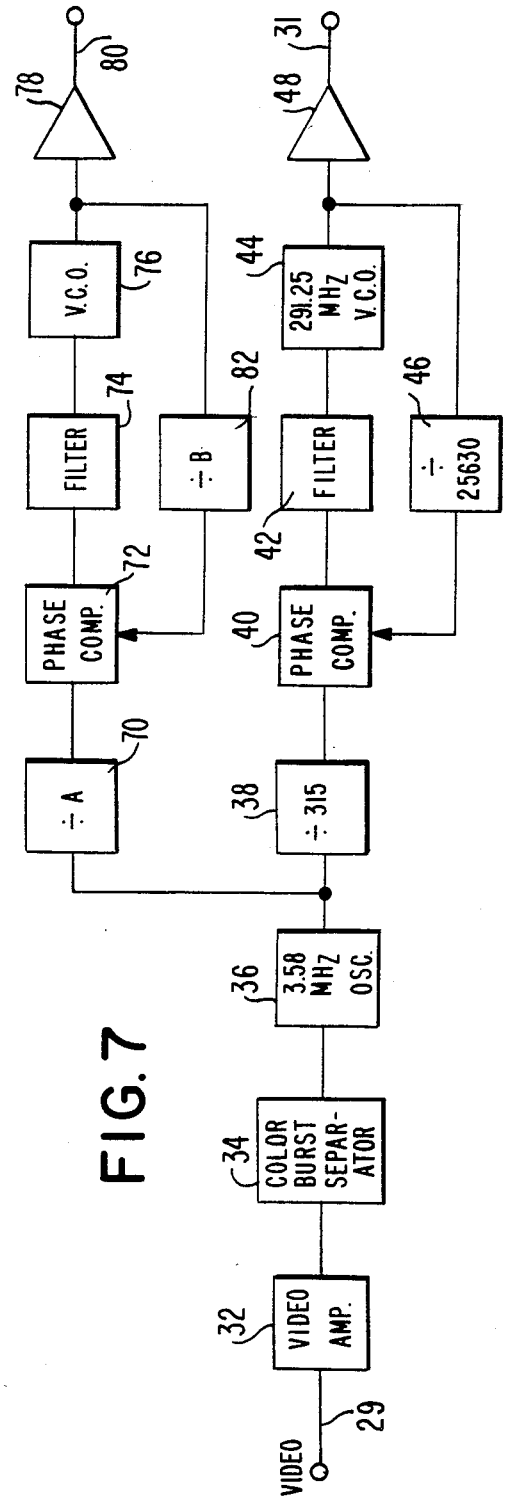
FIG. 7 is a block diagram of a modified embodiment of a phase lock unit suitable for incorporation into a transmitter in accordance with the present invention.

Since the output frequency of phase lock modulator 26 is determined by phase comparer 62, voltage controlled oscillator 64, and up converter 60, the 45.75 MHz signal applied to up converter 57 does not need to be precisely controlled and so can be generated by a local oscillator, as depicted in FIG. 4. Alternatively, the 45.75 MHz signal can be derived from phase lock unit 30. FIG. 7 is a block diagram of a phase lock unit capable of providing this 45.75 MHz signal, the VHF reference signal applied to switch contact 86c in FIG. 6, or a signal of another desired frequency, as well as providing the 291.25 MHz signal on line 31. The phase lock unit of FIG. 7 includes all the circuitry of the unit of FIG. 3 to provide the 291.25 MHz signal, and the description of that circuitry will not be repeated. In addition, the output of oscillator 36 is applied to frequency divider 70, the output of which is connected to one input of phase comparer 72. The output of phase comparer 72 is applied through filter 74 to the control input of voltage controlled oscillator 76, the output of which passes through output amplifier 78 to output line 80. The output of oscillator 76 is also connected to the input of frequency divider 82, the output of which is connected to the second input of phase comparer 72.

The circuitry of components 70–82 operates in a manner similar to that of components 38–48. That is, divider 70 divides the frequency of the signals from oscillator 36 by a first factor and applies the resulting signal to one input of phase comparer 72, while divider 82 divides the frequency of the signal from voltage controlled oscillator 76 by a second factor and applies the resulting signal to the second input of phase comparer 72. The error signal from comparer 72 passes through filter 74 to the control input of voltage controlled oscillator 76 to maintain the output signal from that oscillator at the desired frequency. If output line 80 is to be applied to up converter 57 in FIG. 4, voltage controlled oscillator 76 is centered about a frequency of 45.75 MHz, and frequency dividers 70 and 82 divide the 3.579545$\overline{4}$ MHz signal from oscillator 36 and the 45.75 MHz signal from oscillator 76, respectively, to a common frequency. Likewise, if output line 80 is to be connected to switch contact 86c in FIG. 6, oscillator 76 is centered about an appropriate VHF frequency, and dividers 70 and 82 divide the frequencies of their respective input signals to a common frequency. All the oscillator frequencies required throughout the television transmitter could be synthesized in the phase lock unit in this manner. If the frequency of the signal is of an appropriate value, rather than applying the output of oscillator 36 to a frequency divider 70, frequency divider 70 can be omitted, and the output of frequency 38 applied to the input of phase comparer 72.

Since the video input signal on line 29 to phase lock unit 30 of FIG. 2 only phase locks oscillator 36, loss of that video signal does not result in loss of the output on line 24; it simply permits the frequency of that output to drift from that of any other transmitter that had been utilizing the same video signal to control its frequency.

While the above description has been with reference to television stations broadcasting on the same frequency, the principle is likewise applicable to stations broadcasting on different frequencies and wanting to retain a fixed difference in frequencies. This can be accomplished by changing within the phase lock unit 30 of one of the transmitters the amounts by which dividers 38 and 46 frequency divide their respective input signals, thus changing the frequency of that transmitter's oscillator 44, while still precisely controlling that frequency.

Although the present invention has been described with reference to preferred embodiments, rearrangements and substitutions could be made and still the result would come within the scope of the invention.

What is claimed is:

1. In a television transmitter including a television modulator for modulating an applied video signal; a local oscillator circuit for a generating local oscillation signal; and a converter for converting the local oscillation signal and the modulated video signal to provide a television transmission signal, the improvement in which the local oscillator circuit includes first receiving means for receiving a received video signal; a controlled oscillator applying said local oscillator signal to the converter for mixing with the modulated video signal; and control means coupled to said first receiving means and said controlled oscillator and responsive to a parameter of the received video signal for controlling the frequency of the local oscillation signal in accordance with said parameter of the received video signal to relate the frequency of the provided television transmission signal to said parameter.

2. The improvement of claim 1, further comprising means coupling the applied video signal to said first receiving means so that the received video signal is the same as the applied video signal.

3. The improvement of claim 1 further comprising second receiving means for receiving another television transmission signal; and means coupling said another the television transmission signal to said first receiving means as the applied video signal.

4. The improvement of claim 1 in which said control means controls the frequency of the local oscillation signals in accordance with a characteristic of a color burst signal within the received video signal.

5. In a television transmitter as claimed in claim 1, the further improvement comprising means for applying a VHF reference signal to said television modulator; and means within said television modulator responsive to the VHF reference signal for controlling the frequency of the modulated video signal.

6. The improvement of claim 5 further comprising means for receiving another television transmission signal; and in which said means for applying a VHF reference signal applies said another television transmission signal to said television modulator as said VHF reference signal.

7. The improvement of claim 5 further comprising means for generating said VHF reference signal; and in which said means for applying a VHF reference signal applies the generated VHF reference signal to said television modulator.

8. The improvement of claim 7 further comprising means for controlling the frequency of the generated VHF reference signal in accordance with a second parameter of the received video signal to thereby control the frequency of the modulated video signal.

9. The improvement of claim 5 further comprising means coupling the applied video signal to said first receiving means so that the received video signal is the same as the applied video signal.

10. The improvement of claim 5 further comprising second receiving means for receiving another television transmission signal; and means coupling said another television transmission signal to said first receiving means as the applied video signal.

11. The improvement of claim 5 in which said control means controls the frequency of the local oscillation signals in accordance with a characteristic of a color burst signal within the received video signal.

* * * * *